United States Patent
O'Donnell, Jr.

(10) Patent No.: US 6,686,910 B2
(45) Date of Patent: *Feb. 3, 2004

(54) COMBINED WRITING INSTRUMENT AND DIGITAL DOCUMENTOR APPARATUS AND METHOD OF USE

(76) Inventor: Francis E. O'Donnell, Jr., 709 The Hamptons, Town & Country, MO (US) 63017

(*) Notice: Subject to any disclaimer, the term of this patent is extended or adjusted under 35 U.S.C. 154(b) by 0 days.

This patent is subject to a terminal disclaimer.

(21) Appl. No.: 10/142,414

(22) Filed: May 10, 2002

(65) Prior Publication Data

US 2002/0126105 A1 Sep. 12, 2002

Related U.S. Application Data

(63) Continuation-in-part of application No. 09/655,224, filed on Sep. 5, 2000, which is a continuation-in-part of application No. 09/071,086, filed on May 1, 1998, which is a continuation-in-part of application No. 08/636,126, filed on Apr. 22, 1996, now abandoned.

(51) Int. Cl.[7] ............................. G09G 5/00; G06K 9/18
(52) U.S. Cl. ....................................... 345/179; 382/188
(58) Field of Search ................................ 345/156, 179; 178/18.01, 19.01, 19.04, 19.06; 382/106, 107, 181, 187, 188, 189, 312, 313, 314, 317; 702/92, 94, 95; 235/472.01, 472.02, 472.03; 358/473

(56) References Cited

U.S. PATENT DOCUMENTS

| | | |
|---|---|---|
| 3,376,551 A | 4/1968 | Armbruster |
| 4,780,707 A | 10/1988 | Selker |
| 5,012,349 A | 4/1991 | De Fay |
| 5,159,321 A | 10/1992 | Masaki et al. |
| 5,247,137 A | 9/1993 | Epperson |
| 5,291,213 A | 3/1994 | Krauss |
| 5,294,792 A | 3/1994 | Lewis et al. |
| 5,311,208 A | 5/1994 | Burger et al. |
| 5,371,516 A | 12/1994 | Toyoda et al. |
| 5,434,371 A | 7/1995 | Brooks |
| 5,434,594 A | 7/1995 | Martinelli et al. |
| 5,446,559 A | 8/1995 | Birk |
| 5,548,092 A | 8/1996 | Shriver |
| 5,581,783 A | 12/1996 | Ohashi |

(List continued on next page.)

Primary Examiner—Steven Saras
Assistant Examiner—Paul A. Bell
(74) Attorney, Agent, or Firm—Paul M. Denk

(57) ABSTRACT

A device and method is disclosed for the contemporaneous creation of a digital copy of a written document using a self-contained, hand-held communications device. The self-contained device functions as a writing device and as a digital documenter. It allows for maintenance of position sense within a document thus enabling the user to write cursive, print, draw, write mathematical formulas, draw symbols, punctuate, edit and the like. The invention discloses a self-contained apparatus and method for determining position sense without reliance on special paper, pads, or attachments to the document. The system provides position sense during writing by quantitative comparative analysis of serial images of the surface imperfections of the document. Character generation is discriminated from noncharacter-generating positional changes such as spacing between words. Encryption of data output from the device provides privacy. Encryption and attachment of the device's unique identifying code to a digital copy of a document created by the device provides for confirmation of the source. Uses of the device include short text messaging for cell phones, email composition, note taking in business and education, medical records, and electronic commerce. The imaging system can also be used to read barcodes on documents, allowing for applications to inventory control. Transmission of the digital copy of the document can be through a wired or wireless connection to external digital devices such as cellular phone, personal digital assistant, netpliance, or computer.

27 Claims, 1 Drawing Sheet

U.S. PATENT DOCUMENTS

| | | | |
|---|---|---|---|
| 5,774,602 A | | 6/1998 | Taguchi et al. |
| 5,781,661 A | * | 7/1998 | Hiraiwa et al. .............. 382/188 |
| 5,850,058 A | * | 12/1998 | Tano et al. .................. 382/188 |
| 5,852,434 A | * | 12/1998 | Sekendur .................... 345/179 |
| 5,861,877 A | * | 1/1999 | Kagayama et al. .......... 345/179 |
| 6,084,577 A | * | 7/2000 | Sato et al. ................... 345/179 |
| 6,104,388 A | * | 8/2000 | Nagai et al. ................. 345/179 |
| 6,130,666 A | | 10/2000 | Persidsky |
| 6,181,329 B1 | * | 1/2001 | Stork et al. .................. 345/179 |
| 6,188,392 B1 | * | 2/2001 | O'Connor et al. .......... 345/179 |
| 6,310,988 B1 | * | 10/2001 | Flores et al. ................. 382/189 |
| 6,348,914 B1 | * | 2/2002 | Tuli ............................ 345/179 |
| 6,422,775 B1 | * | 7/2002 | Bramlett et al. ............. 382/188 |
| 6,456,749 B1 | * | 9/2002 | Kasabach et al. ............ 382/314 |
| 6,486,875 B1 | * | 11/2002 | O'Donnell, Jr. ............. 345/179 |

* cited by examiner

COMBINED WRITING INSTRUMENT AND DIGITAL DOCUMENTOR APPARATUS AND METHOD OF USE

CROSS-REFERENCE TO RELATED APPLICATIONS

This application is a continuation-in-part of U.S. patent application 09/655,224 filed Sep. 5, 2000 which is a continuation-in-part of patent application of Ser. No. 09/071,086 filed May 1, 1998 which is a continuation-in-part of Ser. No. 08/636,126, filed Apr. 22, 1996 now abandoned.

STATEMENT REGARDING FEDERALLY SPONSORED RESEARCH OR DEVELOPMENT

Not applicable.

BACKGROUND OF THE INVENTION

This invention relates generally to computer equipment and, more particularly, to a device that functions as a hand-held writing instrument and as a generator of digital copies of whatever is written.

Word processing by keystroke entry is a relatively slow process. Moreover, with the development of the wireless internet made possible by digital cellular phone technology, there exists a need for the creation of digital documents such as e-mail while the sender is mobile. In such a mobile environment, dependence on keystroke entry of data requires the use of miniature keyboards that are very tedious to use. Although voice recognition technology could be used as an alternative upload, it remains relatively slow as well and it suffers from requirement for seclusion in order to avoid extraneous noise and in order to ensure privacy. By contrast, handwriting often is the fastest, most private, most convenient way to prepare documents. In some applications, such as medical records, it is the only practical data entry and data storage means available. This has retarded the ability of healthcare to take full advantage of the internet because it has made the creation of an electronic medical record a redundant task. That is the healthcare provider must write in the chart then either enter data via keystroke or dictate the document and use voice-recognition software or a transcriptionist to convert the information into a digital document.

Of course, conventional pen on paper handwriting has significant drawbacks. However, there is computer software available that converts handwriting to typeface (printed text) and further support writing by hand in the production of documents. Nevertheless, limitations imposed by the hardware required for such pen-based digital document applications have restricted the use and growth of pen-based digital documents to date. Pen-based digital document production heretofore has consisted of grid-type computers with stylus-type writing instruments. Pressure from the stylus on a pressure-sensitive computer screen is used to create a digital copy of the written material. Handwriting software recognition programs can be used to convert the script to printed text. Another approach uses a radio frequency (RF) generator incorporated into a writing pen in conjunction with a special pad containing an array of RF signal receptors in order to track the position of the pen tip in the document. This information is used to create a digital copy of the written document. An example of this technology is the system sold by A. T. Cross under the trademark "I Pen". These types of systems are inconvenient, however, because they necessitate access to the special screen or pad. That is, the writing instrument is limited to its application within the system and cannot be used independently of the special screen or pad to create the digital document. Attempts to create writing instruments that could make digital copies of the written document independent of a special writing pad or screen include the use of a special paper with a subtle pattern on it for recognition by a sensing means, the Anoto system (Ericcson Manufacturing, Sweden). This is impractical because it requires that every document be prepared on this special paper. The pad, grid and special paper technologies represent a means of sensing and tracking position of the writing device in a document.

Others have attempted to create a digital record of the written document by using specially modified writing instruments that do not require special screens, pads, or paper. Whereas the latter approaches all use a position-sensing means to create the digital record, these alternate approaches use motion-detection means of the writing instrument alone to create a digital copy of the written document. The advantage of using such motion-sensing means is that it allows the use of the device on any ordinary writing surface. For example, in 1964, Armbruster (U.S. Pat. No. 3,376,551) described a magnetic writing device wherein an ink pen mechanism included a rotating ball for the electromagnetic detection and quantification of movement by induction of an electric current. Thus, distance was not directly measured. The speed of ball rotation determined the amount of electric current induced which was proportional to the velocity. The output was variably to an electric typewriter or to a computer. After the introduction of the computer mouse in the 1980's, Masaki (U.S. Pat. No. 5,159,321) in 1992 taught the use of an ink pen mechanism including a rotating ball that would function as a mouse-like device for computer input. Unlike Armbruster, Masaki taught a spring-type of sensor mechanism for detection and quantification of movement of the rotating ball point wherein ink on the ball surface would cause displacement of two spring-loaded sensing devices at right angles yielding velocity data. In my co-pending application (U.S. patent application Ser. No. 09/071,086), I disclose a distantometer means to detect motion of the writing pen in order to create a digital copy of the written document. Others have taught the use of tiny micro accelerometers to create a digital copy of the written document (WO9922338).

These approaches that use a motion-sensing means give the user more freedom because they don't require a special writing surface like the position-sensing technologies. On the other hand, they have limitations such as the inability to edit a document because the position or location of the writing device in the digital copy is unknown. This also limits their usefulness for writing other than for continuous script or cursive. That is to say, such motion-sensing technologies must assume that the written data always belongs at the trailing end of the document. Thus printing, symbol drawing as for the Chinese language, mathematical formulas, picture drawing, table creation, and the like are all very difficult if not impossible with these motion-sensing technologies. This inability to identify position in a document is a severe disadvantage of writing devices that use a motion-sensing technology to create a digital copy of the written document.

The present invention shares the freedom of use of the motion-sensing technologies but overcomes the limitations of the prior art by using a self-contained position-sensing means. In particular, unlike all prior position-sensing art, the position-sensing means of the present invention does not require a special writing surface or a separate device attached to the writing surface. In 1994 (U.S. Pat. No. 5,294,792), Lewis proposed to use a plurality of tiny cameras within a pen to image the writing on the document as a way to track the position of the pen in the document. This is impractical as it would require a very powerful microprocessor and a large data storage to match snippets of writing in order to maintain position sense and this approach would lead to errors if the document had words repeated within it. It does not seem that this device was ever commercialized. Another approach has been to use a separate device attached to the writing paper that would allow a triangulation method of tracking using ultrasound (InMotion, Inc., Plano, Tex.) or infrared (Digital Ink, Inc., Boston, Mass.) to identify the pen's position in the document. These digital pens are cumbersome as they are not self-contained devices. That is to say they require a separate device attached in some way to the document in order to enable the capture of a digital copy of the written document. Moreover, in order to function properly, the attached device must remain in a stable location relative to the document.

SUMMARY OF THE INVENTION

It is among the principal objects of the present invention to provide a self-contained writing instrument that can create a contemporaneous digital copy of the written document.

Another object of the present invention is to provide a self-contained device that can be used to write cursive, print, draw, create symbols, record mathematical functions, format, tabulate, and edit documents in writing and in digital format without dependence on a special writing surface.

Another object of the present invention is to provide such a self-contained writing instrument that can be used to record on normal writing surfaces such as white paper while creating a digital copy of the written document.

Another object of the invention is to provide a means to transmit the digital data from the writing device to a digital device such as a digital audio speaker, digital display screen, personal computer, laptop computer, personal digital assistant, netpliance, digital cell phone, or to a server on the internet.

Yet another object of the invention is to provide such a self-contained writing instrument capable of producing a digital copy of the written document but that does not require a special writing surface such as a pad, grid, or specially marked paper.

Another object of the invention is to provide such a self-contained writing instrument that can collect, process, and store digital data from the instrument as the device is being used.

Another object of the present invention is to provide for downloading of digital data from external sources, and the audio or visual display of said data.

Another object of the present invention is to provide an audio or visual display within the device of the digital data for confirmation by the operator of the digital data produced by the device.

Another object of the present invention is to provide for privacy of the digital copy by encrypting it.

Another object of the present invention is to provide for confirmation of the source of the digital document by using an encrypted unique identifier for each device.

Another object of the present invention is to provide for a means to ensure that the source of a digital document is a unique example of the present invention by providing a unique encrypted identifier code that can be attached to each digital document.

In accordance, the invention, generally stated, a self-contained writing instrument that also functions as a digital document generator and transmitter is provided. The writing instrument is configured like a pen, although the writing point can be a fountain pen, ballpoint pen, laser pen, jet pen, pencil, marker, chalk and the like. For the purposes of the present invention, reference to the writing aspect as a "pen" will be understood to incorporate these and other writing means. Further, the device contains a position-sensing means by which a change in the position of the device in the document is detected without dependence on a special writing surface, a special pad, or an attachment to the writing surface. The device further includes a sensing means to determine when the positional changes are due to written elements and when the positional changes are due to non-writing movements such as for punctuation, editing, printing, and the like. The device also includes a microprocessor means to measure the positional data changes, a memory means for data storage, and a power means for energy. The device includes a transmission means for communication of the data to a computer or to the internet or other such digital devices.

DETAILED DESCRIPTION

Figure 1:
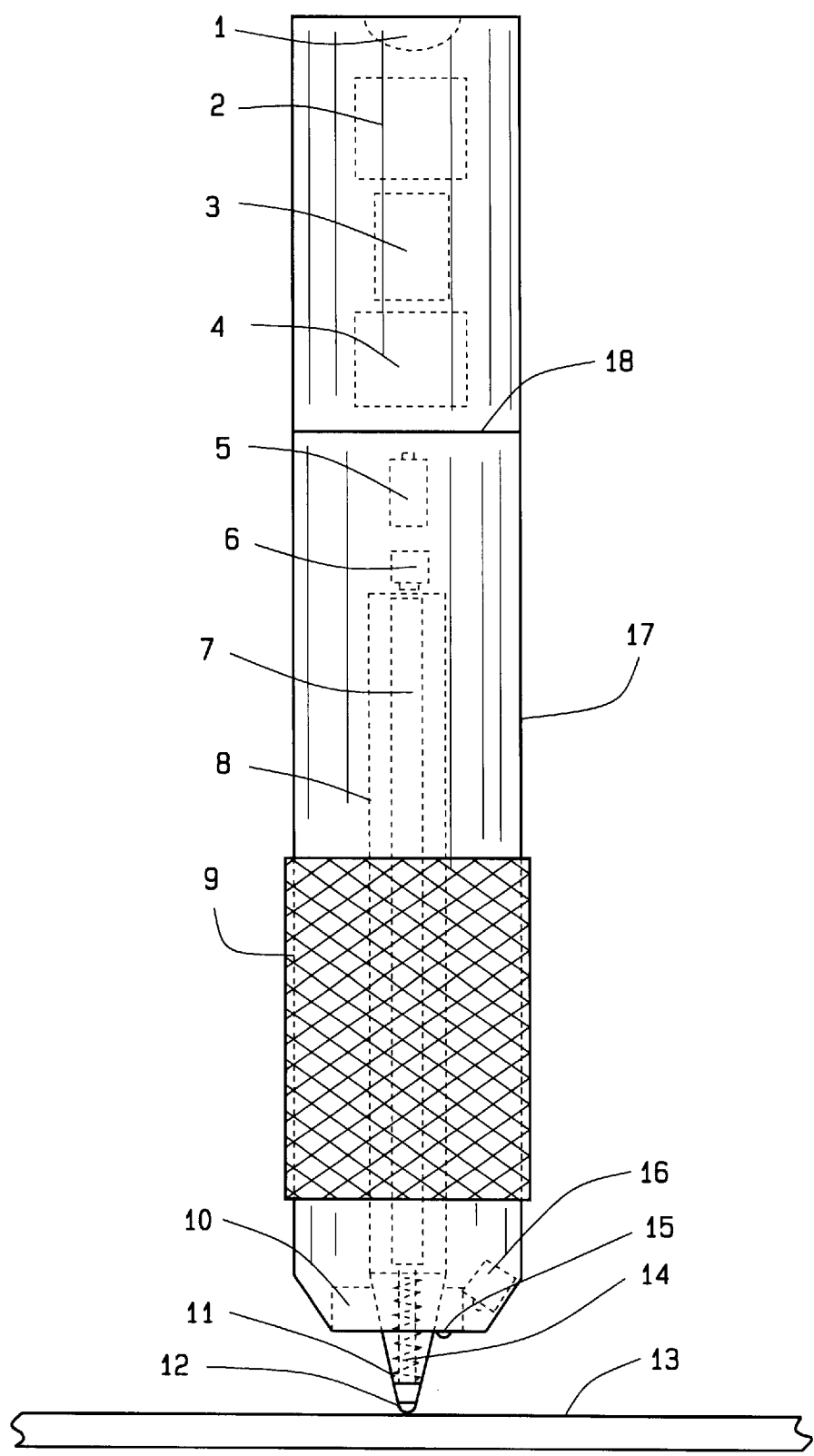
FIG. 1. A lateral view of the writing device as a ballpoint pen with an optical position-sensing means.

The device consists of a writing tip (12), shown here as a ballpoint pen tip, with ink cartridge (7) positioned within the lower portion of the device housing (17). For convenience, the housing may feature a knurled grip sleeve (9) near the writing end of the device. In this embodiment, the writing tip nib (11) engages an internal tension spring (14) for displacement of a sliding tube assembly (8) for contact with the receptor (6) thereby signaling to the microprocessor (4) that the writing element is engaged onto the writing surface (13) for character generation on the writing surface. When the device is lifted off the writing surface for positioning such as word spacing, the contact at (6) is released signaling that the device motion is not due to character formation on the writing surface. The camera (10) is positioned so that it can capture images of the writing surface focused by the lens (15) and illuminated by the light source (16). The image data from the camera is transmitted to a flash memory card (3) for subsequent relay on to and analysis by the microprocessor or directly through to the microprocessor. Output from the microprocessor is then stored in the flash memory card for relay onto a radio frequency (RF) digital transmitter/receiver (2). The battery (5) is positioned along the central cavity of the device. A screw type closing/opening mechanism of the device housing (18) can be conveniently located at about the level of the battery and ink cartridge in order to allow access for change of either component. In this embodiment of the invention, the camera also serves as a photodetector means wherein the camera is monitoring the intensity of the illuminated field. A subthreshold light intensity signal from the camera results in a signal from the microprocessor means to an audio alarm from a digital speaker (1).

PREFERRED EMBODIMENTS

It is a preferred embodiment of the present invention that a ballpoint pen have near the nib a small charge coupled device (CCD), or a complementary metal-oxide semiconductor image sensor (CMOS) (Photobit, Inc., Pasadena, Calif.) for capture of images of the writing surface. The CCD, CMOS, or other type of camera can be oriented so as to "look" parallel to, or directly at, the writing surface. That is to say, the optical position-sensing technology does not rely upon a view of the written characters in order to function properly. The camera can be selected so as to be sensitive to wavelengths invisible to the human eye such as ultraviolet and infrared light. In order to enhance the normal surface features and the naturally-occurring minor imperfections of the writing surface, the light source preferably should have an effective angle of about 75 degrees or less to the writing surface using a light source such as a visible, ultraviolet or infrared coherent (i.e. laser) or non-coherent light. Reflective devices such as mirrors and other directional optical devices such as fresnel prismatic lenses, and fiberoptic bundles and the like can be used so that the camera itself and the light source are more remote from the writing tip. Moreover, the housing of the writing tip can be transparent to infrared light or ultraviolet light but opaque to visible light and therefore hide the optical imaging system from view. As the pen is used to write, the writing tip is depressed slightly so as to signal to the built-in microprocessor that the positional change is due to creating a character or stroke and not to non-writing positional changes required for crossing the t or doting the i or j, punctuation, word spacing, alphabetical letter printing, symbols, editing, table formation, drawing, mathematical formulas, and the like. For the purposes herein, we define character generation as the strokes of writing that make contact between the writing tip and the writing surface and which would normally result in a written mark on the document. Alternatively, the device can contain a button, which must be depressed during character generation in order, for example, to expose the writing tip. Alternatively, a strain gauge can be used to detect pressure on the writing tip during contact with the writing surface, or a micro accelerometer can be used to identify the very sudden changes in acceleration due to resistance of the pen against the writing surface that is evident in writing as opposed to non-writing positional changes.

When the writing device is repositioned to execute non-writing positional functions as opposed to character generation, it is important that the position in the document be tracked by the microprocessor. Therefore, as an optional feature, if the user begins to lift the writing instrument too far away from the writing surface, the user can be warned by a signal such as an audio beep or a light such as a diode. The distance above the writing surface can be ascertained, for example, by using a photodetector wherein a drop off in the intensity of the illuminated field below a preset threshold would result in the microprocessor generating a signal to a warning mechanism so as to alert the user that any further distance will result in a loss of positional data required for full function of the device. Preferably, this intensity should correlate to a distance of at least 5 mm or so from the writing surface.

If the position within the document is lost, the writer can place the writing device at the last written element and signal to the system, for example, by double depressing the writing tip, in order to identify a reference position within the document and thus regain full function of the device. Optionally, the device can include a diode, for example, that signals to the user that position sense has been lost and/or that position sense is restored. Similarly, an audio signal can be used to accomplish the same communication with the user of whether or not position sense for the device is functioning. With restoration of full function, the device can be used once again to make non-character generation positional changes for editing, printing, symbol generation, drawing, tabulation, mathematical formulation, and the like. The imaging sample rate of the camera is preferably set at a sufficient frequency such as required to accommodate even a very fast writer. Preferably, an image sample rate of 100 Hz to 10,000 Hz is used. A typical flash memory device can buffer the serial image files if needed in order to be available for analysis by the microprocessor means. The microprocessor determines the serial positional change by comparing the landmarks on the writing surface to the landmarks on the preceding image of the writing surface in order to determine change in direction and distance. The preferred processing power is in the range of 5–25 or more MIPS. The distance and directional data are typical two dimensional vector information that is then stored in a memory device for later transmission. This can be a typical flash memory card.

Subsequent transmission can be via detachable memory chip, wire, or wireless. In the latter case, the mode of transmission can be via infrared, radio frequency, ultrasound, or digital cellular telephony. If the user has access to a digital cell phone, wireless radio frequency transmission from the pen to the digital cellular phone is a preferred embodiment. So-called "bluetooth" technology is an emerging wireless transmission technology that can be used in the present device.

The data can be encrypted by the microprocessor in order to ensure privacy. For example, a 128 bit encryption is a preferred method. Moreover, the microprocessor can have a unique, encrypted identifier number or alphanumeric code that is attached to each digital file so that the source of the digital document is virtually indisputable. In this way, the device provides reasonable assuredness that the origin of a digital document is from a particular device. Accordingly, the device provides a secure method of electronic commerce (e-commerce) over the internet For example, it can provide a digital copy of a signature and it can provide proof that the signature came from the device registered to the signatory.

Regardless of the mode of data transmission from the writing device, the data can be transmitted to any digital device such as a computer, a personal digital assistant (PDA), a netpliance or via the internet to a server. The vector data so generated is conveniently exported to a variety of application programs such as word processing programs, drawing programs, spread sheets, e-mail programs, and the like where it is displayed as written data such as handwriting or printing, or numbers, or formulas, or language symbols such as Chinese. The data can be in ASCII format allowing for easy compression of the files. It is possible to use bitmap files, especially monochrome bitmap files, for storage and for transmission of the digital copy. The conversion of handwritten script information to printed text can be accomplished using a variety of commercially available software programs such as PenOffice (ParaGraph, Inc.). This conversion can occur within the device or in an external digital device such as a personal computer (PC) or a server on the internet. These handwriting script recognition programs can be self-educating and feature neural networks wherein they improve their accuracy for a specific user by accumulating experience with a variety of words and symbols based upon an individual's edits. If the user is mobile, in particular, and uses a wireless access to the internet, a preferred embodiment provides a server that stores the individual's handwriting script recognition files for access on the internet regardless of the user's location and independent of the user's access to a computer device. To provide the energy for lighting, image capture, microprocessor, data storage, and data transmission a battery is preferred.

In another preferred embodiment, the same infrared light source used for illumination can also be used conveniently to provide the wireless transmission of data to a digital device such as a personal computer, laptop, personal digital assistant (PDA), netpliance, or cellular digital phone using a commercially available IRT (infrared transmission) port. The camera of the invention can be used to receive infrared communication from a digital device such as personal computer, allowing two-way communication between the invention and the digital device.

When used to transmit a digital document to a cellular phone, the present invention is a particularly convenient way to compose so-called short message text, typically about 160 characters or less in length. As compared to the redundant and tedious use of a cell phone key pad, the present invention quickly and efficiently can be used to compose text messages for transmission by a cellular phone to another cellular phone, to a text message pager, to a text message wristwatch, or over the internet to a computer. In the latter case, the document can be an email communication whose length can be substantially longer.

In another preferred embodiment, the same camera means used for imaging of the writing surface can also be used conveniently to provide a photodetector means for detecting a subthreshold illumination of the writing surface so as to warn the user that the position within the document could become lost with any further movement of the device away from the writing surface.

In another preferred embodiment, the same camera means used for imaging of the writing surface can also be used conveniently to scan a barcode in a document. In this mode, the microprocessor function is used to recognize the pattern of a typical barcode. Accordingly, the device offers a means for identifying an item such as a package by scanning a barcode identifying the package, and then capturing in the same digital file a digital copy of annotations such as a signature or inventory count.

In another preferred embodiment, the function of the device includes the elimination by the microprocessor means from the digital copy of any section of the written document that is marked for deletion by the operator. For example, a line through a word would result in deletion of that word from the digital copy. Thus the present invention does not require that the final digital copy of the written document be unedited unless so desired.

In another preferred embodiment, the data transmission means of the present invention can allow for two-way communication between the invention and a digital device such as personal computer, laptop, personal digital assistant, netpliance, digital cellular phone, and the like. In this embodiment, the present invention can provide many of the functions of the digital device. For example, using the audio speaker of the present invention, data downloaded from a digital device can be available to the operator of the present invention. Conversion of digital data to speech is widely available. Moreover, the audio output can be used to monitor the digital data output of the present invention. For example, if the invention is being used to write a prescription, the audio output could confirm the identification of the prescription and the instructions for dispensing and taking the prescription.

In another embodiment of the present invention, the inclusion of a display screen such as an LCD (liquid crystal display) on the side of the writing device of the present invention provides a convenient means of displaying downloaded digital data as well as data generated by the use of the invention. For example, the download might be a series of questions as for an examination. In another example, the operator may write a prescription and the display shows the data conversion to printed text for confirmation of the prescription.

Variations or modifications to the subject matter of this invention may occur to those skilled in the art upon review of the summary provided herein, in addition to the descriptions of its preferred embodiment, in light of the drawings. Such variations, if within the spirit of this invention, are intended to be encompassed within the scope of the invention as described herein.

What is claimed:

1. A handheld, self-contained, communication device that is used to create a written document and to create a digital copy of said document comprising, a writing means, and a position-sensing means that functions by capturing and comparing serial images of the surface imperfections on the document surface, comprising an imaging means to capture images of the imperfections on the document surface, an illumination means to highlight imperfections on the document surface a microprocessor means to compare the serial images of the document surface for measuring positional change of the device, a data storage means for input and/or output from the microprocessor means, and an energy means to power the illumination, imaging, memory, and microprocessor means.

2. The device of claim 1 wherein the imaging means is a camera.

3. The device of claim 1 wherein the imaging means is a charge coupled device (CCD) camera.

4. The device of claim 1 wherein the imaging means is a complimentary metal oxidesemiconductor (CMOS) camera.

5. The device of claim 1 wherein the data storage means is a flash memory device.

6. The device of claim 1 wherein the imaging means is used to capture an image of abarcode for inclusion in a digital document created by said device.

7. A handheld, self-contained, communication device that is used to create a written document and to create and to transmit a digital copy of said document comprising, a writing means, and a position-sensing means that functions by capturing and comparing serial images of surface imperfections on the document surface, comprising an imaging means to capture images of the document surface, an illumination means to highlight imperfections on the document surface, a microprocessor means to compare the serial images of the document surface for measuring positional change of the device, a data storage means for input and/or output from the microprocessor means, and a transmission means for sending digital data from and/or to the data storage means to an external digital device, and an energy means to power the illumination, imaging, memory, microprocessor, and transmission means.

8. The device of claim 7 wherein the transmission means is selected from the group of wireless technologies comprising infrared, radiofrequency, bluetooth, ultrasonic, and laser.

9. The device of claim 7 wherein the transmission is by a wire connected to an external device.

10. The device of claim 7 wherein the external digital device for receiving the transmission is selected from the group comprising cellular phone, personal digital assistant (PDA), netpliance, laptop computer, or desktop computer.

11. The device of claim 7 wherein the imaging means is used to capture an image of a barcode for inclusion in a digital document created by said device.

12. A method for producing a digital copy of a written document by using a self-contained pen device that records digitally the position of said device in a document by using a microprocessor to analyze serial images captured by a camera of the document's surface and then transmitting said digital document to an external digital device, wherein a loss of position sense of said device within a document is communicated to the user by an audio or light signal from said device.

13. The method of claim 12 wherein positional changes resulting in character generation are identified by a depression of the writing tip.

14. The method of claim 12 wherein the successful restoration of position sense of said device within a document is communicated to the user by an audio or light signal from said device.

15. A method of producing a digital copy of a written document by using a self-contained pen device that records digitally the position of said device in a document by using a microprocessor to analyze serial images captured by a camera of the document's surface and then transmitting said digital document to an external digital device, wherein a loss of position sense within a document is regained by positioning the pen device at the last point of character generation in said document and then signaling to the device by a predetermined manipulation such as double depressing the writing tip that the device is at a specific location within the document.

16. The method of claim 15 wherein said device is used to capture an image of a barcode in a digital document created by said device.

17. The method of claim 15 wherein a line drawn through written characters is used to edit out these characters from the digital copy of the document.

18. The method of claim 15 wherein the microprocessor transmits a unique encrypted identification number or alphanumeric code along with the digital document so as to identify the origin of the digital document.

19. The method of claim 18 wherein the self-contained pen device is used to provide a secure electronic commerce transaction by transmitting its microprocessor's unique, encrypted identifying number or alphanumeric code with the digital copy of a document created by said device.

20. The method of claim 15 wherein the microprocessor encrypts the digital document data in order to ensure privacy.

21. The method of claim 15 wherein the digital copy of the document is intended for use as an electronic medical record.

22. The method of claim 15 wherein the digital copy of the document is intended for use as a short text message for transmission to, and for display on, a cellular phone.

23. The method of claim 15 wherein the digital copy of the document is intended for us as an email sent over the Internet.

24. The method of claim 15 wherein the digital copy of the document is intended for note taking for business or educational purposes.

25. The method of claim 15 wherein the digital copy of the document is intended for use in inventory control.

26. The method of claim 15 wherein the digital document consisting of cursive writing is converted by the device's microprocessor to a digital document of printed text.

27. The method of claim 15 wherein the digital document consisting of cursive writing is converted by an external digital device to a digital document of printed text.

\* \* \* \* \*